May 16, 1967 L. I. ZIRIN 3,319,892
VARIABLE EXHAUST NOZZLE ASSEMBLY
Filed Sept. 1, 1965 3 Sheets-Sheet 1
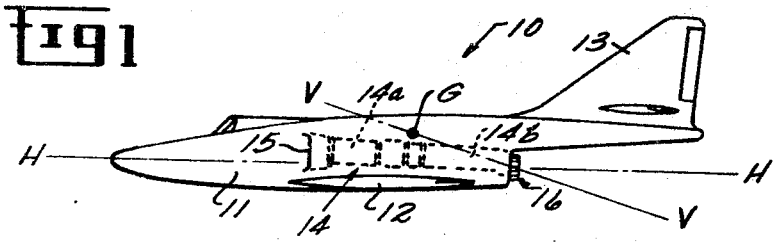
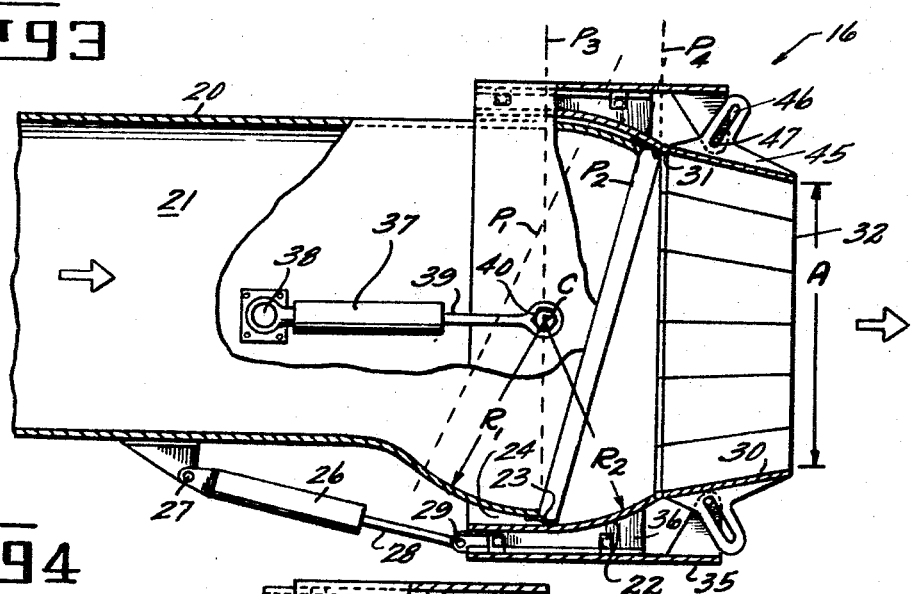
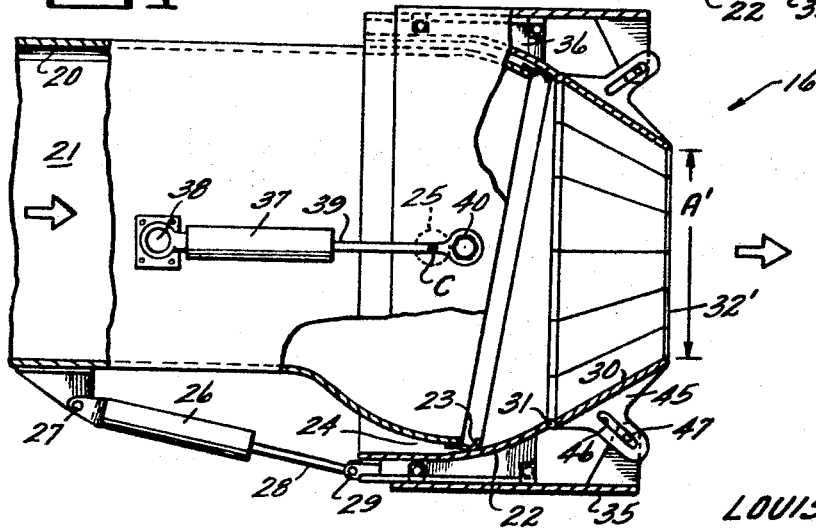
INVENTOR.
LOUIS I. ZIRIN
BY
George R. Powers
ATTORNEY

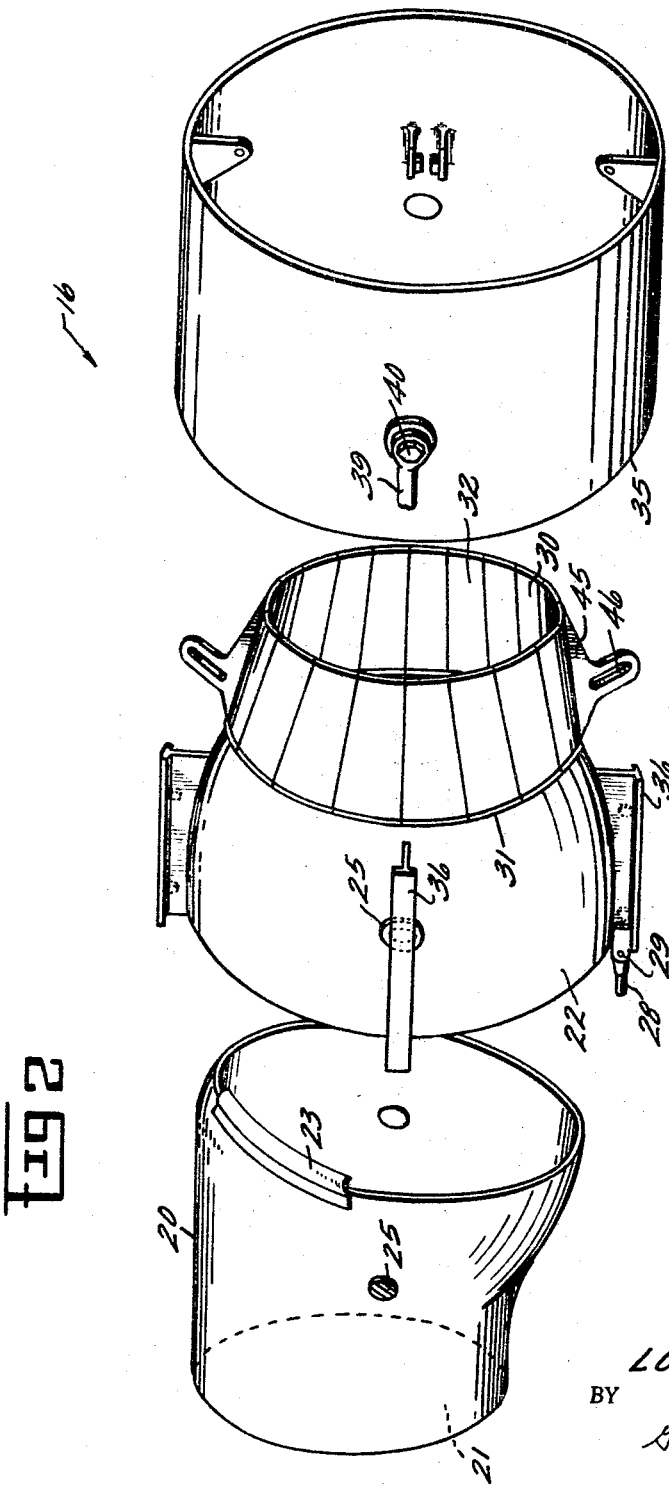

May 16, 1967 L. I. ZIRIN 3,319,892
VARIABLE EXHAUST NOZZLE ASSEMBLY
Filed Sept. 1, 1965 3 Sheets-Sheet 3
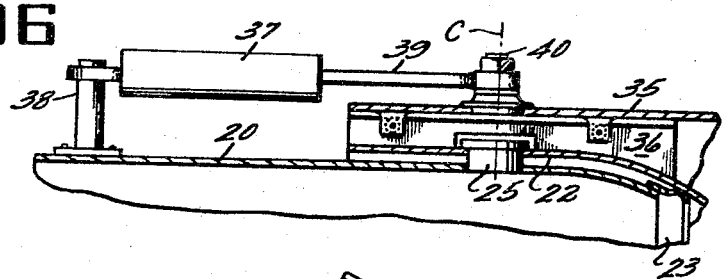
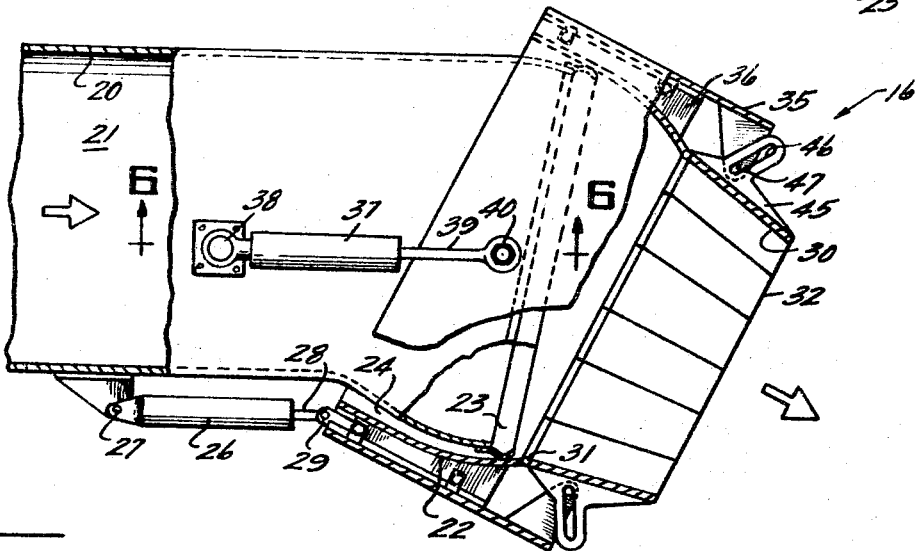
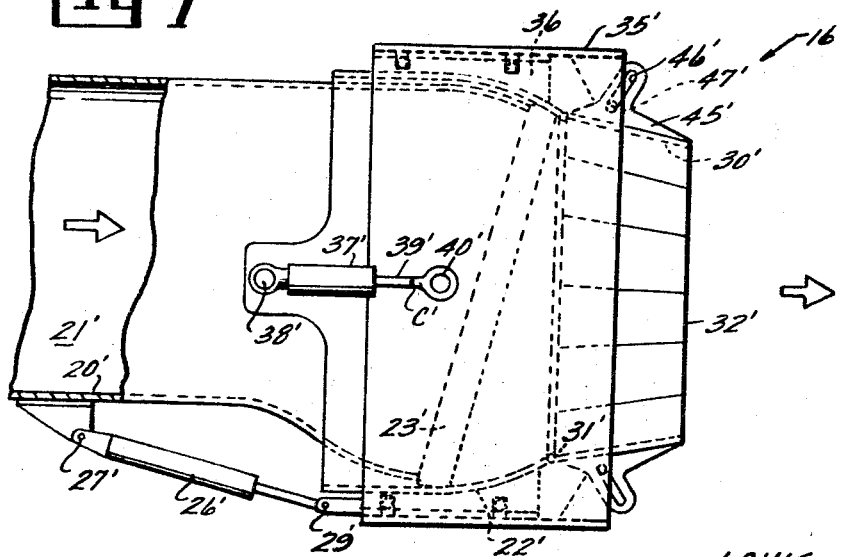
INVENTOR.
LOUIS I. ZIRIN
BY
George R. Powers
ATTORNEY

United States Patent Office 3,319,892
Patented May 16, 1967

3,319,892
VARIABLE EXHAUST NOZZLE ASSEMBLY
Louis Isadore Zirin, Marblehead, Mass., assignor to General Electric Company, a corporation of New York
Filed Sept. 1, 1965, Ser. No. 484,409
9 Claims. (Cl. 239—265.35)

This invention relates to a variable exhaust nozzle assembly jet propulsion engine and, more particularly, to an exhaust nozzle arrangement having both variable area and variable angle or direction capabilities. The nozzle assembly of this invention is especially suited for use in high performance VTOL and STOL aircraft.

VTOL (vertical take-off and landing) and STOL (short take-off and landing) aircraft may be operated in areas devoid of conventional air strips since they require little or no horizontal roll during the take-off and landing phases of operation. Consequently, such aircraft are particularly suited for military missions such as close combat support and for flights into and out of densely populated urban areas. For the most part, VTOL and STOL aircraft are capable of subsonic speeds only; consequently, it has been proposed to provide such aircraft with both vertical and horizontal flight capabilities by means of relatively simple swivel-type exhaust nozzles which in first operative positions provide only horizontal thrust and in second operative positions provide at least a substantial vertical component of thrust. Under certain circumstances, however, it may be desirable to provide, in combination with the vertical flight capability, a capability of supersonic level flight. It is well known to those skilled in the art that the propulsion systems used in such highspeed aircraft frequently require variable area exhaust nozzles in order to provide efficient operation over a broad range of transonic operating conditions. In other words, an exhaust nozzle arrangement for a supersonic VTOL or STOL aircraft must not only be capable of varying the direction of thrust, but also be capable of varying the area of the exhaust opening in order for the propulsion system to operate efficiently.

It is, therefore, an object of this invention to provide an improved variable exhaust nozzle assembly having both variable area and variable angle or direction of thrust capabilities.

Another object of this invention is to provide an improved exhaust nozzle assembly for permitting both efficient transonic level flight operation and vertical operation of VTOL and STOL aircraft.

A further object is to provide a relatively simple and straightforward variable exhaust nozzle arrangement for supersonic VTOL and STOL aircraft.

Briefly stated, in carrying out the invention in one form, an axial passageway for the flow of motive fluid is formed by wall means such as an afterburner casing having, adjacent the downstream end of the passageway, the configuration of a spherical segment. A ring also having the configuration of a spherical segment surrounds the spherical portion of the casing and is pivotally connected thereto. The pivot points between the casing and the ring are located on an axis which passes through the common center of both the spherical ring and the spherical portion of the casing. In addition, the axis on which the pivot points are located is disposed transverse to the axial direction of fluid flow in the passageway. To provide a variable area exhaust opening for efficient transonic operation, a plurality of circumferentially overlapping flaps are carried by the spherical ring and extend downstream therefrom, means being provided for varying the positions of the flaps so as to thereby vary the area of the exhaust opening formed by the flaps. To provide the variable direction of thrust capabilities necessary in VTOL and STOL aircraft, means are provided for rotating the spherical ring about the axis on which it is pivotally mounted, the ring carrying the flaps with it so as to direct the motive fluid discharged from the exhaust opening in accordance with the position of the spherical ring.

By a further aspect of the invention, the means for positioning the flaps includes an annular member carried by and circumferentially surrounding the spherical ring and first actuating means for moving the annular member through a range of positions. The annular member is in turn connected to the flaps for controlling the area of the exhaust opening as a function of the position of the annular member. In accordance with an illustrated embodiment of the invention, the first actuating means is pivotally connected to the annular member, the pivotal connections being located on an axis which is coaxial with the axis on which the spherical ring is mounted when the annular member is positioned to schedule a maximum area exhaust opening. With the entire exhaust nozzle apparatus thus being pivotally supported on a single axis when a maximum area exhaust opening is scheduled, second actuating means may easily pivot the spherical ring and, consequently, the exhaust opening to direct the stream of motive fluid in a desired manner.

While the invention is distinctly claimed and particularly pointed out in the claims appended hereto, the invention will be better understood and appreciated, along with other objects and advantages thereof, from the following detailed description when considered in connection with the accompanying drawings, in which:

FIG. 1 is a pictorial view of a STOL aircraft embodying the present invention;

FIG. 2 is an exploded pictorial view of a variable exhaust nozzle assembly utilizing the present invention;

FIG. 3 is a view partially in cross section showing the elements of the exhaust nozzle assembly of FIG. 2 positioned to provide a maximum area exhaust nozzle opening and to produce forward or horizontal thrust;

FIG. 4 is a view similar to FIG. 3 showing the exhaust nozzle elements positioned to provide a minimum area exhaust nozzle opening and to produce forward thrust;

FIG. 5 is a view similar to FIGS. 3 and 4 showing the elements positioned to provide vertical thrust;

FIG. 6 is a view taken along line 6—6 of FIG. 5; and

FIG. 7 is a view similar to FIG. 3 illustrating a modified exhaust nozzle assembly.

Referring first to FIG. 1, a STOL (short take-off and landing) aircraft 10 is illustrated, the aircraft 10 having a fuselage 11, a pair of wings 12, and a tail assembly 13. The aircraft 10 has a single fuselage mounted jet propulsion engine 14 which receives combustion air through inlet ports 15 and discharges high energy combustion gases through a variable exhaust nozzle assembly indicated generally by the numeral 16. As indicated heretofore, the present invention resides in the novel arrangement of the elements comprising this variable exhaust nozzle assembly 16. Before proceeding, however, to a detailed description of the nozzle assembly 16 and its operation, it should be noted that the jet propulsion engine 14 includes a gas generator portion 14a and an afterburner 14b for permitting high speed flight. In view of the high performance capabilities of the aircraft 10, it is, of course, necessary that means be provided for varying the area of the exhaust opening of the nozzle 16 in accordance with different conditions encountered during transonic flight. Furthermore during normal flight conditions other than those encountered during landing and take-off maneuvers, the motive fluid is discharged from the exhaust nozzle 16 in a direction parallel to the longitudinal axis of the aircraft 10. In other words, the stream of exhaust gas is discharged in a direction indicated by line H—H in FIG. 1. In accordance with the present invention, the exhaust nozzle 16 is positioned during the take-off and landing modes of operation such that the exhaust gas is discharged along the direction indicated in FIG. 1 by the line V—V. It will be obvious to those skilled in the art that thrust produced along the line V—V has both vertical and horizontal components and that such vertical thrust can reduce substantially the horizontal roll required during either take-off or landing. In an aircraft such as the STOL aircraft 10, it is desirable that the thrust during both the horizontal and the vertical modes of flight be directed either through or as close as possible to the center of gravity G of the aircraft 10 so that there will be no unbalanced moments on the aircraft which will tend to cause undesired and hard to control aircraft motion such as, for example, pitch and yaw.

With reference now being directed to FIGS. 2 and 3, the novel arrangement of elements comprising the variable exhaust nozzle 16 will be described. As shown, the afterburner 14b of the jet propulsion engine 14 includes a generally cylindrical wall 20 enclosing an axially disposed passageway 21 through which high temperature products of combustion flow as indicated by arrows in FIG. 3 between upstream and downstream ends thereof. The configuration of the wall or casing 20 changes adjacent the downstream end of the passageway 21 from that of a cylinder to that of a spherical segment having a radius $R_1$ and a spherical center C. More particularly, as illustrated by FIG. 3, and elevation view of the exhaust nozzle assembly 16, the spherical portion of the wall 20 is defined between nonparallel planes $P_1$ and $P_2$ as indicated by broken lines. The planes $P_1$ and $P_2$ are both perpendicular to a vertical plane containing the longitudinal axis of the passageway 21; in other words, as viewed in FIG. 3, the planes $P_1$ and $P_2$ are perpendicular to the viewing plane.

An annular or ring-shaped member 22 surrounds the spherical portion of the casing 20 in closely spaced relationship, the ring 22 also having a portion between parallel planes $P_3$ and $P_4$ of spherical configuration. The planes $P_3$ and $P_4$ are also perpendicular to a vertical plane containing the longitudinal axis of the passageway 21. The spherical portion of the ring 22, which also has its center at C, has a radius $R_2$ that is only slightly greater than the radius $R_1$. An annular sealing member 23 is peripherally secured to the downstream end of the casing 20 for sealing the very slight gap 24 between the spherical portions of the casing 20 and the ring 22, and the spherical ring 22 is pivotally supported from the casing 20 by pins 25 (see FIG. 6). The pins 25 are located on an axis which is perpendicular to the direction of fluid flow in the passageway 21, which is horizontal when the aircraft is at rest, and which extends through the spherical center C. For simplicity, this axis will be hereinafter referred to as a "spherical axis" common to both the spherical portion of the casing 20 and the spherical portion of the ring 22.

Turning attention now to FIGS. 3–5, a hydraulic cylinder 26 is pivotally secured to the casing 20 at 27, and a piston rod 28 extending therefrom is pivotally connected to the upstream end of the spherical ring 22 at 29. This hydraulic cylinder and piston arrangement comprises an actuating means for pivoting the spherical ring 22 about the pins 25 between the forward thrust position illustrated by FIG. 3 and a vertical thrust position illustrated by FIG. 5. The manner in which this motion occurs will be discussed in greater detail at a later point in this specification, and it will readily occur to those skilled in the art that other actuating means could be used in the practice of the invention such as pneumatic or mechanical systems.

As illustrated by FIGS. 2–4, a plurality of circumferentially overlapping flaps 30 are pivotally hinged at 31 to the downstream end of the spherical ring 22. The flaps 30 are movable in unison between first positions illustrated by FIG. 3 in which an exhaust opening 32 having a maximum area A is formed and second positions illustrated by FIG. 4 in which an exhaust opening 32' having a minimum area A' is formed. This variable flap arrangement is a rather conventional arrangement for variable area nozzles used for transonic flight, and it will therefore not be described in detail. Those familiar with such arrangements will, of course, know that the maximum area exhaust opening 32 is normally scheduled for efficient operation when the afterburner 14b is in operation while the minimum area opening 32' is used for low speed, non-afterburning use. Openings intermediate the extreme positions illustrated may be scheduled for various operating conditions.

The novel apparatus for moving the flaps 30 between their extreme operative positions will now be described. A cylindrical ring 35 circumferentially surrounds the spherical ring 22 and is slidably supported on four tracks or guides 36 two of which are shown peripherally spaced about the spherical ring 22 and extending outwardly therefrom. These tracks 36 extend axially relative to the longitudinal axis of the passageway 21 when the spherical ring 22 is in its forward thrust position so that the cylindrical ring 35 can be moved axially between first and second end positions illustrated by FIGS. 3 and 4, respectively. To move the cylindrical ring 35 in this manner, hydraulic cylinders 37 are pivotally connected to the casing 20 at pivot points 38, and the piston rods 39 extending therefrom are pivotally connected to the annular ring 35 by pins 40 (see FIG. 6). As will be noted from FIG. 3, these pins 40 are disposed on an axis which is coaxial with the common spherical axis of the pins 25 when the ring 35 is in its first end position; this is quite significant for reasons which will be discussed presently. A plurality of the flaps 30 have plates 45 extending outwardly therefrom the plates having cam slots 46 therein for receiving pins 47 carried from the downstream end of the cylindrical ring 35. Axially downstream movement of the annular ring 35 from its first end position to its second end position will force the pins 47 along the cam slots 46 in the manner illustrated and thereby move the flaps from their first, maximum area positions to their second, minimum area positions.

With the spherical ring 22 in its forward thrust position and the cylindrical ring 35 in its first end position as illustrated by FIG. 3, the entire exhaust nozzle assembly 16 is pivotally mounted on an axis passing through the concentric centers C of the spherical portions of the casing 20 and the ring 22. Accordingly, the entire nozzle assembly can be pivoted by the hydraulic cylinder 26 about the common spherical axis from the forward thrust position of FIG. 3 to the vertical thrust position of FIG. 5. When, however, the spherical ring 22 is in its forward thrust position and the cylindrical ring 35 is in its second end position as illustrated by FIG. 4, the entire assembly is no longer supported on a single axis since the pins 25 and the pins 40 are on separate, axially spaced axes. When the elements are arranged in this manner, the assembly 16 cannot be pivoted to the vertical thrust position since rotation about two axes cannot occur simultaneously (not that the hydraulic cylinders 37 and the piston rods 39 form at any particular nozzle area setting rigid structures interconnecting the pivot points 38 and 40). Once the nozzle assembly 16 is positioned in the vertical thrust position of FIG. 5, however, the flaps 30 may be varied in the same manner as described above with respect to the horizontal thrust position since the hydraulic cylinders 37 and their associated piston rods 39 are pivotally connected at both 38 and 40.

With the structural arrangement of the variable exhaust nozzle assembly 16 thus understood, its operation will be described. Except during vertical flight operations such as take-off and landing, the spherical ring 22 is positioned in the horizontal thrust position illustrated by FIGS. 3 and 4, and the cylindrical ring 35 is positioned to provide an exhaust opening of the proper flow area. By suitably positioning the flaps 30, a broad range of transonic operating conditions can be accommodated; as a general rule, the cylindrical ring 35 is positioned in its first end position to provide a maximum area exhaust opening during operation of the afterburner 14b. When substantial vertical thrust is required, the flaps 30 are positioned to provide a maximum area exhaust opening and the spherical ring 22 is rotated about the common spherical axis to the vertical thrust position of FIG. 5. Since the afterburner 14b will generally be operated during such vertical flight modes to provide maximum lift, the flaps 30 are normally left in the wide open positions. If desired, however, the flaps 30 may be moved to reduce the exhaust area for non-afterburning operation during vertical flight as well as during horizontal flight.

As just described, the variable exhaust nozzle assembly 16 has a full range of variable area capabilities during both horizontal and vertical flight modes, but it can be shifted between the flight modes at only the maximum area setting. In FIG. 7, a modification is shown in which a variable exhaust nozzle assembly 16' can be shifted between its vertical and the horizontal modes at any area setting. It will be readily apparent to those skilled in the art that the significant difference between this embodiment and the embodiment described above is that a hydraulic cylinder 37' is pivotally connected to the spherical ring 22' at a pivot point 38' rather than to the afterburner casing 20'. Accordingly, the entire nozzle assembly is supported on the common spherical axis passing through pins 25' and the spherical center C' at all times, regardless of the positions of the nozzle flaps 30'.

It is thus seen that the invention provides an improved variable exhaust nozzle assembly having both variable area and variable angle or direction of thrust capabilities. The invention further provides a relatively simple and straightforward variable exhaust nozzle assembly for permitting both efficient transonic level flight and vertical operation of VTOL and STOL aircraft.

It will be understood that the invention is not limited to the specific details of construction and to the arrangement of the particular embodiments illustrated and described herein. It is, therefore, intended to cover in the appended claims all such changes and modifications which may occur to those skilled in the art without departing from the true spirit and scope of the invention.

What is claimed as new and is desired to secure by Letters Patent of the United States is:

1. In an aircraft powered by a jet propulsion engine, a variable exhaust nozzle assembly for controlling the velocity and direction of discharge of motive fluid, said exhaust nozzle assembly comprising:
   wall means forming a passageway disposed axially with respect to the longitudinal axis of the aircraft for the flow of motive fluid between upstream and downstream ends thereof,
   said wall means adjacent the downstream end of said passageway having the configuration of a spherical segment,
   a ring having the configuration of a spherical segment surrounding the spherical portion of said wall means in proximity thereto and concentric therewith,
   a plurality of circumferentially overlapping flaps pivotally hinged to the downstream end of said spherical ring and extending therefrom to form an exhaust opening,
   means pivotally connecting said spherical ring to the spherical portion of said wall means about a common spherical axis both transverse to the axial direction of flow in said passageway and horizontal relative to the attitude of the aircraft at rest,
   said spherical ring being movable through a range of positions bounded by a forward thrust position in which motive fluid may be discharged from said exhaust opening without being deflected and a vertical thrust position in which motive fluid may be discharged from said exhaust opening with a substantial downward component of velocity relative to the attitude of the aircraft at rest,
   an annular member circumferentially surrounding and supported by said spherical ring for axial movement relative thereto when said spherical ring is in said forward thrust position, said annular member being movable through a range of positions,
   means interconnecting said annular member and said plurality of flaps for positioning said flaps in accordance with the position of said annular member,
   the exhaust opening formed by said flaps having a maximum area when said annular member is in a first end position within said range of positions and having a minimum area when said annular member is in a second end position within said range of positions,
   first actuating means pivotally connected to said annular member for moving said annular member through said range of positions when said spherical ring is in said forward thrust position to thereby vary the area of said exhaust opening,
   the pivotal connections between said first actuating means and said annular member being coaxial with said common spherical axis when said annular member is in said first end position,
   and second actuating means for rotating said spherical ring about said common spherical axis between said forward thrust position and said vertical thrust position when said annular member is in said first end position,
   whereby the area of said exhaust opening can be varied only when said spherical ring is in said forward thrust position and whereby the direction at which motive fluid is discharged can be varied only when said annular member is in said first end position and said exhaust opening is at its maximum area.

2. A variable exhaust nozzle assembly as defined by claim 1 in which said first and second actuating means interconnect said wall means and said spherical ring and said annular member, respectively.

3. A variable area and variable direction exhaust nozzle assembly for jet propulsion engines, said exhaust nozzle assembly comprising:
   wall means forming an axial passageway for the flow of motive fluid between upstream and downstream ends thereof,
   said wall means adjacent the downstream end of said passageway having the configuration of a spherical segment,
   a ring having the configuration of a spherical segment surrounding the spherical portion of said wall means in proximity thereto and concentric therewith,
   a plurality of flaps carried by said spherical ring and extending downstream therefrom to form an exhaust opening,
   means to vary the positions of said flaps so as to thereby vary the area of said exhaust opening,
   and means to rotate said spherical ring about an axis transverse to the downstream direction of fluid flow in said passageway so as to thereby vary the direction at which motive fluid is discharged through said exhaust opening.

4. A variable area and variable direction exhaust nozzle assembly for jet propulsion engines, said exhaust nozzle assembly comprising:
   wall means forming an axial passageway for the flow of motive fluid between upstream and downstream ends thereof, said wall means adjacent the downstream end of said passageway having the configuration of a spherical segment, a ring having the configuration of a spherical segment surrounding the spherical portion of said wall means in proximity thereto and concentric therewith, means pivotally connecting said spherical ring to the spherical portion of said wall means about a common spherical axis transverse to the downstream direction of fluid flow in said passageway, a plurality of circumferentially overlapping flaps carried by said spherical ring and extending downstream therefrom to form an exhaust opening, means for moving said flaps through a range of positions to thereby vary the area of said exhaust opening, and means for rotating said spherical ring about said common spherical axis when said flaps are in a fixed, predetermined position within said range of positions, whereby the direction at which motive fluid is discharged through said exhaust opening may be varied when said flaps are in said fixed, predetermined position.

5. A variable area and variable direction exhaust nozzle assembly for jet propulsion engines, said exhaust nozzle assembly comprising:

wall means forming an axial passageway for the flow of motive fluid between upstream and downstream ends thereof, said wall means adjacent the downstream end of said passageway having the configuration of a spherical segment, a ring having the configuration of a spherical segment surrounding the spherical portion of said wall means in proximity thereto and concentric therewith, means pivotally connecting said spherical ring to the spherical portion of said wall means about a common spherical axis transverse to the axial direction of fluid flow in said passageway, a plurality of circumferentially overlapping flaps carried by said spherical ring and extending downstream therefrom to form an exhaust opening, an annular member circumferentially surrounding and movably supported by said spherical ring for movement through a range of positions, means interconnecting said annular member and said plurality of flaps for positioning said flaps in accordance with the position of said annular member, the exhaust opening formed by said flaps having a maximum area when said annular member is in a first end position within said range of positions and having a minimum area when said annular member is in a second end position within said range of positions, first actuating means for moving said annular member through said range of positions to thereby vary the area of said exhaust opening, and second actuating means for rotating said spherical ring about said common spherical axis to thereby vary the direction at which motive fluid is discharged through said exhaust opening.

6. A variable area and variable direction exhaust nozzle assembly as defined by claim 5 in which said first actuating means interconnects said spherical ring and and said annular member for moving said annular member relative to said spherical ring.

7. A variable area and variable direction exhaust nozzle assembly for jet propulsion engines, said exhaust nozzle assembly comprising:

wall means forming an axial passageway for the flow of motive fluid between upstream and downstream ends thereof, said wall means adjacent the downstream end of said passageway having the configuration of a spherical segment, a ring having the configuration of a spherical segment surrounding the spherical portion of said wall means in proximity thereto and concentric therewith, means pivotally connecting said spherical ring to the spherical portion of said wall means about a common spherical axis transverse to the axial direction of fluid flow in said passageway, a plurality of circumferentially overlapping flaps carried by said spherical ring and extending downstream therefrom to form an exhaust opening, an annular member circumferentially surrounding and movably supported by said spherical ring for movement through a range of positions, means interconnecting said annular member and said plurality of flaps for positioning said flaps in accordance with the position of said annual member, the exhaust opening formed by said flaps having a maximum area when said annular member is in a first end position within said range of positions and having a minimum area when said annular member is in a second end position within said range of positions, first actuating means for moving said annular member through said range of positions to thereby vary the area of said exhaust opening, and second actuating means for rotating said spherical ring about said common spherical axis when said annular member is in said first end position, whereby the direction at which motive fluid is discharged through said exhaust opening may be varied when said annular member is in said first end position and said flaps are forming a maximum area exhaust opening, 8. A variable area and variable direction exhaust nozzle assembly for jet propulsion engines, said exhaust nozzle assembly comprising:

wall means forming an axial passageway for the flow of motive fluid between upstream and downstream ends thereof, said wall means adjacent the downstream end of said passageway having the configuration of a spherical segment, a ring having the configuration of a spherical segment surrounding the spherical portion of said wall means in proximity thereto and concentric therewith, means pivotally connecting said spherical ring to the spherical axis transverse to the axial direction of flow in said passageway, a plurality of circumferentially overlapping flaps pivotally hinged to the downstream end of said spherical ring and extending therefrom to form an exhaust opening, an annular member circumferentially surrounding and movably supported by said spherical ring for movement through a range of positions, means interconnecting said annular member and said plurality of flaps for positioning said flaps in accordance with the position of said annular member, the exhaust opening formed by said flaps having a maximum area when said annular member is in a first end position within said range of positions and having a minimum area when said annular member is in a second end position within said range of positioning, first actuating means pivotally connected to said annular member for moving said annual member through said range of positions to thereby vary the area of said exhaust opening, the pivotal connections between said first actuating means and said annular member being coaxial with said common spherical axis when said annular member is in said first end position, and second actuating means for rotating said spherical ring about said common spherical axis when said annular member is in said first end position, whereby the direction at which motive fluid is discharged through said exhaust opening may be varied when said annular member is in said first end position and said flaps are forming a maximum area exhaust opening.

9. A variable area and variable direction exhaust nozzle assembly as defined by claim 8 in which said first and second actuating means interconnect said wall means and said spherical ring and said annual member, respectively.

References Cited by the Examiner

UNITED STATES PATENTS

| | | | |
|---|---|---|---|
| 2,926,489 | 3/1960 | Halford et al. | 239—265.39 |
| 3,003,312 | 10/1961 | Jewell | 239—265.35 |
| 3,231,197 | 1/1966 | Strom | 239—265.39 |
| 3,233,834 | 2/1966 | Cottrell et al. | 239—265.35 |
| 3,281,082 | 10/1966 | Kerry | 239—265.35 |
| 3,290,887 | 12/1966 | Poole | 239—265.35 |

EVERETT W. KIRBY, *Primary Examiner.*